United States Patent
Barnes et al.

(10) Patent No.: US 12,513,338 B2
(45) Date of Patent: Dec. 30, 2025

(54) EXTENDED BIT-RANGE IN HEIF

(71) Applicant: APPLE INC., Cupertino, CA (US)

(72) Inventors: Leo Barnes, Haiar (SE); Davide Concion, Campbell, CA (US); Alexandros Tourapis, Los Gatos, CA (US)

( * ) Notice: Subject to any disclaimer, the term of this patent is extended or adjusted under 35 U.S.C. 154(b) by 130 days.

(21) Appl. No.: 18/486,634

(22) Filed: Oct. 13, 2023

(65) Prior Publication Data
US 2024/0196019 A1    Jun. 13, 2024

Related U.S. Application Data

(60) Provisional application No. 63/430,583, filed on Dec. 6, 2022.

(51) Int. Cl.
*H04N 17/00*    (2006.01)
*H04N 19/182*   (2014.01)
*H04N 19/70*    (2014.01)

(52) U.S. Cl.
CPC ........... *H04N 19/70* (2014.11); *H04N 19/182* (2014.11)

(58) Field of Classification Search
CPC .............................. H04N 19/70; H04N 19/182
See application file for complete search history.

(56) References Cited

U.S. PATENT DOCUMENTS

| | | | |
|---|---|---|---|
| 11,044,478 B2 | 6/2021 | Tourapis et al. | |
| 2006/0029133 A1 | 2/2006 | Chen | |
| 2010/0091840 A1* | 4/2010 | Gao | H04N 19/70 375/240.2 |

OTHER PUBLICATIONS

"Understanding iOS 11 and Apple's New HEIF/HEVC Photo Standard"; DNP Imagingcomm America Corporation, Technical Paper, White Paper, Sep. 8, 2017; pp. 1-5.
"High Efficiency Image File Format"; Wikipedia, The Free Encyclopedia; Oct. 9, 2023; website: https://en.wikipedia.org/wiki/High_Efficiency_Image_File_Format; pp. 1-23, pp. 1-13.
S. Mckewon; "Forensic Considerations for the High Efficiency Image File Format (HEIF)"; IEEE International Conference on Cyber Incident Response, Coordination, Containment & Control (Cyber Incident 2020); website: https://jpeg.org/index.html; 8 pages.
International Patent Application No. PCT/US2023/076872; Int'l Preliminary Report on Patentability; dated Jan. 28, 2025; 17 pages.
International Patent Application No. PCT/US2023/076872; Int'l Search Report and the Written Opinion; dated Feb. 22, 2024; 16 pages.
Kim et al.; "AhG 5 and 18: High Bit-depth Coding Using Auxilliary Picture"; Joint Collaborative Team on Video Coding; JCTVC-O0090; Oct. 2013; 4 pages.

* cited by examiner

Primary Examiner — Jonathan R Messmore (57) ABSTRACT

Improved image coding techniques for high-bit depth images includes deriving two or more separate lower-bit-depth main and extension images from one high-bit-depth source image, and then encoding them separately as lower-bit-depth images. At a decoder, the separate main and extension images are decoded, and then combined to create a single reconstructed source image. The improved techniques may use lossless or lossy codecs, and may provide some backward compatibility with legacy decoders.

22 Claims, 4 Drawing Sheets

EXTENDED BIT-RANGE IN HEIF

CLAIM FOR PRIORITY

The present disclosure benefits from priority of U.S. patent application Ser. No. 63/430,583, filed Dec. 6, 2022 and entitled "Extended Bit-Range In HEIF," the disclosure of which is incorporated herein in its entirety.

BACKGROUND

This disclosure relates to image compression techniques.

Some image coding protocols include an image container format such as ISO base media file format (ISOBMFF) that support flexible image codecs with their own coding protocol. For example, High Efficiency Image Format (HEIF) is a container format based on ISOBMFF that supports encapsulation of images encoded with various codecs such as MPEG's High Efficiency Video Coding (HEVC) coding protocol and/or Alliance for Open Media's (AOMedia's) AV1 coding protocol. A HEIF file encapsulating images coded according to HEVC codecs is called High Efficiency Image Container (HEIC), while a HEIF file encapsulating images coded according to AV1 codecs is called AV1 Image File Format (AVIF). These coding protocols, such as HEIC and AVIF, typically evolve over time, with new versions of the coding protocols adding new features to older legacy versions of the coding protocols.

DETAILED DESCRIPTION

This disclosure provides techniques for encoding high-bit-depth images. Image coding protocols such as HEVC and AV1 typically have a fixed or maximum supported number of bits per pixel value used within a decoder conforming to the coding protocol. However, images with bit-depths higher than a codec's maximum may beneficially provide additional pixel value range (in additional high-order bits) and/or pixel value precision (in additional low-order bits). For example, a camera that captures high dynamic range (HDR) images may support a wider range of brightness and colors than can typically be represented in an HEVC or AV1 encoded image. In another example, raw image sensor data from a profession digital camera may require more bits per pixel than an HEVC or AV1 codec format. An improved image coding technique enables encoding of a source image with a greater number of bits per pixel than an underlying codec allows by encoding a high-bit-depth source image as two or more separate main and extension images, where both the main and extension images are coded at a lower bit depth than is supported by the underlying codec. A container format may include extension parameters for combining the main and extension images at a decoder into a reconstruction of the source image at its original bit-depth. In aspects, one or both of the main and extension images may be encoded with a lossy codec for which a perfect reconstruction of the source image at a decoder is not guaranteed, and a legacy-compatible container format encapsulating both the main and extension images may allow a legacy container decoder to reconstruct the main image while ignoring hidden extension images.

In an encoder aspect, improved coding techniques may comprise deriving a main image from most significant bits of pixel values of a source image, pixel values of the main image having a main bit depth determined by a selected upshift number. The main image may be encoded according to a coding protocol, and the encoded main image may be decoded as a reconstructed main image. An extension image may be derived from the reconstructed main image, the source image and the selected upshift number, wherein pixel values of the extension image have an extension bit depth. The extension image may be encoded according to the coding protocol. The encoded main image, the encoded extension image, and coding parameters indicating the extension bit depth and the selected upshift number may all be stored according to a syntax of a coded media file. In aspects, the upshift number may be selected based on a bit depth of pixel values in the source image and a bit depth constraint of the coding protocol; the extension bit depth may be selected as the selected upshift number plus zero or more extra bits; the coding protocol may supports the legacy number of bits and may not support the source number of bits; and the coding parameters may further indicate a selected extension algorithm used to derive the extension images from the residual image. In one example, the extension bit depth may be at least two bits greater than the upshift which may allow, for example, one sign bit since a difference image values may be both positive or negative and at least one bit for correcting errors in a lossy compression of the main image.

In a decoder aspect, improved techniques may comprise extracting, from a syntax in a coded media file, an encoded main image, an encoded extension image and coding parameters including a selected upshift number of bits and an extension bit depth; decoding the encoded main image according to a coding protocol to produce a reconstructed main image having pixels with a main bit depth; decoding the encoded extension image according to the coding protocol to produce a reconstructed extension image having pixel with the extension bit depth; and combining the reconstructed main image with the reconstructed extension image based on the selected upshift number and the extension bit depth to produce a reconstructed source image. In aspects, the extension bit depth may be greater than upshift number; the image decoder may use a coding protocol that supports the legacy number of bits and does not support the source number of bits; and the extracted coding parameters may further indicate a selected extension algorithm for the combining of the reconstructed main and extension images.

Figure 1:
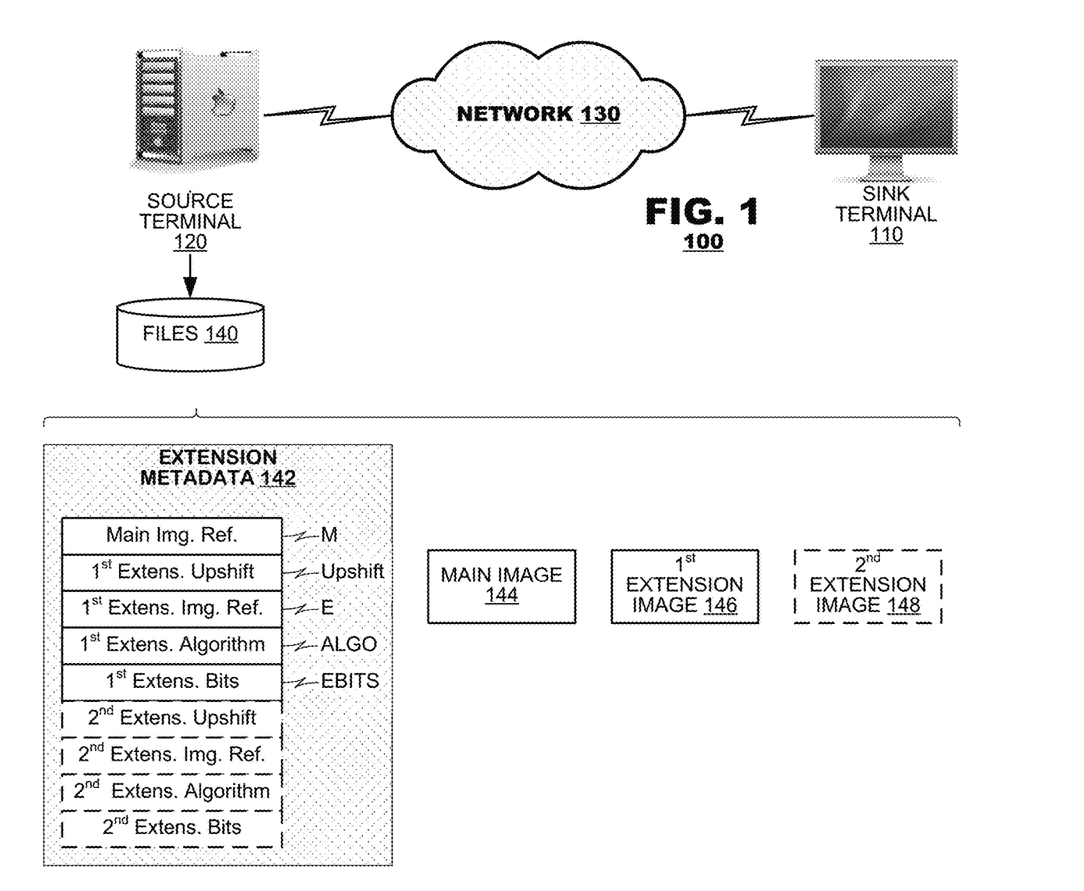
FIG. 1 illustrates a simplified block diagram of an image delivery system according to an aspect of the present disclosure.

FIG. 1 illustrates a simplified block diagram of an image delivery system 100 according to an aspect of the present disclosure. Delivery system 100 includes a source terminal 120 with a store of files 140 connected to sink terminal 110 via network 130. Files 140 include a main image 144, a first extension image 146, and extension metadata 142. In an aspect, extension metadata may include a reference to an encoded main image (M), a reference to a first extension image reference (E), and coding parameters for the first extension image such as indications of a first extension upshift (Upshift), a first extension bit depth (EBITS), and a first extension algorithm (ALGO). A reference to images, such as the reference to main image M and reference to the first extension image E, may be an identifier (ID) of the referenced image, a pointer to the location of the corresponding image in a coded media file such as files 140, or may otherwise provide information to allow a parser to extract the reference image from a coded media file.

In operation, files 140 may represent an encoded source image, and image delivery system 100 may transmit files 140 from source terminal 120 to sink terminal 110. In an aspect not depicted in FIG. 1, a decoding system, such as might be included in sink terminal 110, may decode the encoded images. In a first aspect, a decoder may decode a first version of a reconstructed source image by decoding only main image 144. In a second aspect, a decoder may decode both the main image and the first extension image, and then combine them according to the coding parameters for the first extension image to create a second version of the reconstructed source image, where the second version may be higher quality than the first version. As will be explained below regarding FIGS. 2-5, the coding parameters may be used both to create the first extension image at an encoder, and to combine the first extension image with a main image at a decoder.

In an optional feature, files 140 may include additional extension images, such as second extension image 148 and corresponding additional extension metadata such a reference to an encoded second extension image along with coding parameters for the second extension image such as a second extension upshift, a second extension bit depth, and a second extension algorithm. In an aspect, second extension coding parameters may be used to create the second extension image at an encoder, and to combine the second extension image with a first extension image and main image at a decoder.

Figure 2:
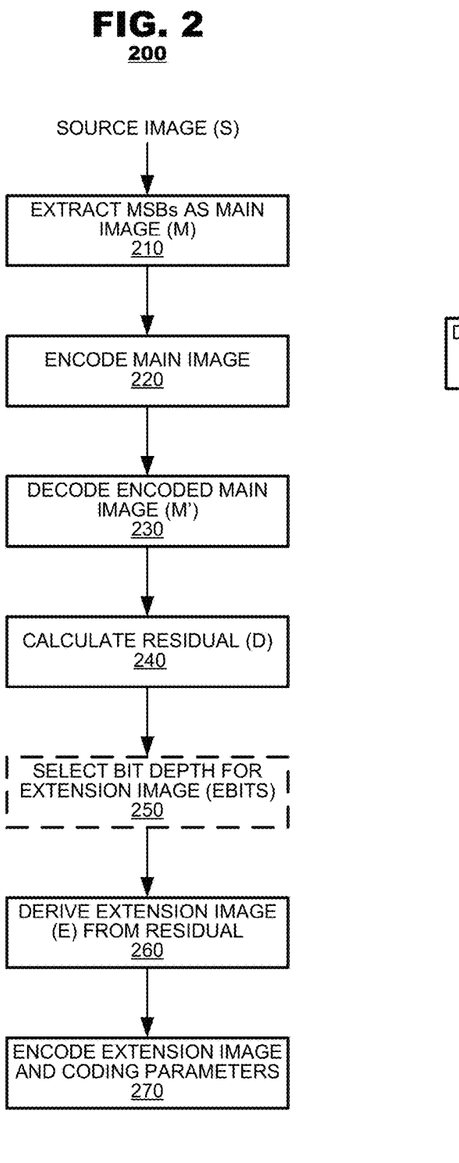
FIG. 2 is a flow chart depicting a method for encoding an image, according to an aspect of the present disclosure.

FIG. 2 is a flow chart depicting an image encoding method 200 according to an aspect of the present disclosure. In an aspect, encoding method 200 may be used to encode a source image into the files 140 of FIG. 1. FIG. 2 includes references to images identified as S. M. D. and E, and reconstructed version of these images are indicated with a single quote, such as S', M', D', and E'. In the encoding method 200, the most significant bits (MSBs) of pixel values in a source image (S) may be extracted to create a main image (M) (box 210). The main image may be encoded (box 220), and then decoded to create a reconstructed main image (M') (box 230). A residual image (D) may be calculated as the difference between the reconstructed main image (M') and the source image (S) (box 240). An extension image (E) may be derived from the residual image (box 260). The extension image may then be encoded along with extension coding parameters. In an optional aspect, a bit depth for the extension image may be selected (box 250), and this extension bit depth may be used derive the extension image (box 260) and encoded as a coding parameter.

In an aspect, image, such as S, E, and M, may be comprised of pixels, where each pixel has one or more values. For example, pixels may have one greyscale value, three values corresponding to red, green, and blue in an RGB color format, or four values corresponding to one luma value, two chroma values, and one alpha (blending) value in a YUVA color format. References to as bit depth of an image may refer to the bit depth of each value in the pixels of the image.

In an aspect, encoding method 200 may be applied recursively, to create additional extension images (such as second extension image 148 in FIG. 1). Just as encoding method 200 splits a source image into a main and extension image, the main image and/or the extension may be further split into two separate images. For example, the operation for encoding the main image (box 220) may include encoding the main image as a source image S with method 200, which will split the main image into two images. Alternately or in addition, the operation for encoding the extension image (box 270) may include encoding the extension image as a source image with method 200, which will split the extension image into two separate images. In an aspect, extension coding parameters (not depicted in FIG. 1) may indicate which images are recursively split in this way.

Figure 3:
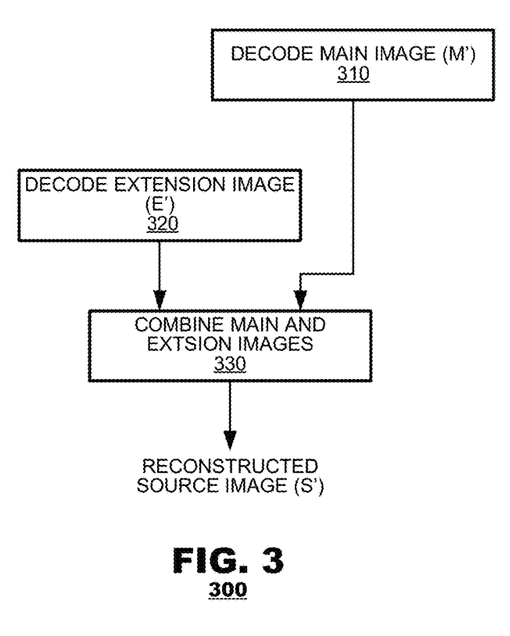
FIG. 3 is a flow chart depicting a method for decoding an image, according to an aspect of the present disclosure.

FIG. 3 is a flow chart depicting an image decoding method 300 according to an aspect of the present disclosure. In an aspect, decoding method 300 may be used to decode files 140 at sink terminal 110 (in FIG. 1). Decoding method 300 include decoding a main image to produce a reconstructed main image (M') (box 310), and decoding an extension image to produce a reconstructed extension image (E') (box 320). The reconstructed main and extension images may then be combined (box 330) to produce a reconstructed source image (S').

Figure 4:
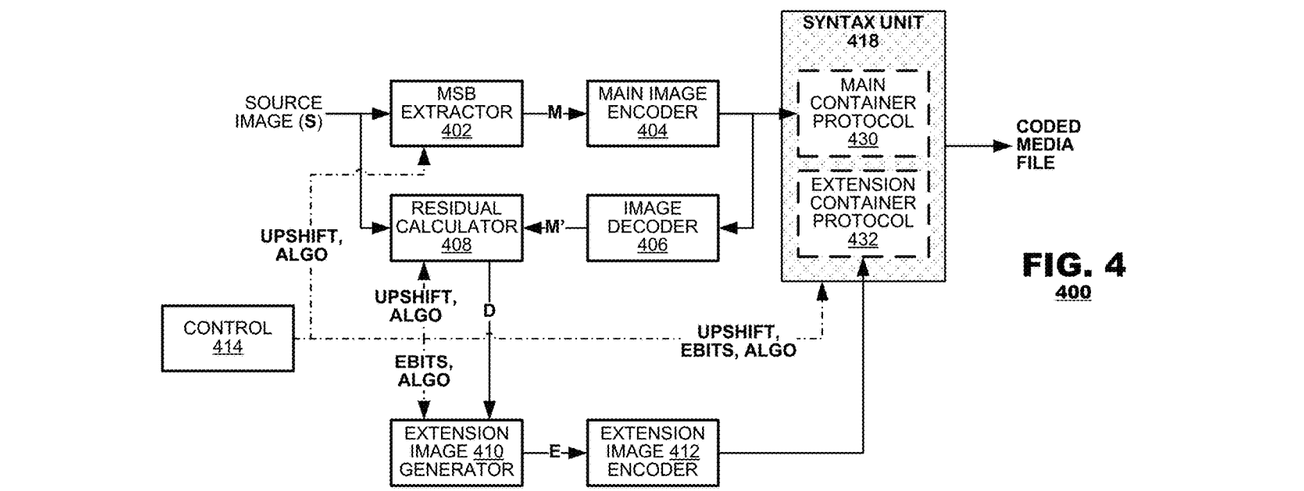
FIG. 4 is a functional block diagram of an encoding system according to an aspect of the present disclosure.

Three different example algorithms for encoding a source image (S) with encoding method 200 and decoding with decoding method 300 are provided below. In an aspect, the ALGO extension coding parameter may indicate which of these algorithms has been selected for a coding of particular source image. The pseudocode below explains some operations of boxes 402, 408, 410, and 412.

In an aspect, decoding method 300 may be applied recursively to integrate more than one extension image when more than one extension image is available at a decoder. For example, after combing decoded main and first extension images (box 330), the result may recursively be further combined with a decoded second extension image. In an aspect, extension coding parameters (not depicted in FIG. 1) may be inferred to represented in a coded media file and may indicate ordering for which images are to recursively be combined in this way, A first algorithm may use a lossless codec for coding the main image (in boxes 220 and 310):

```
encode1(S, upshift, ebits) {
// NOTE: Typically upshift == ebits for this algorithm
// Extract most significant bits of source
M = S >> upshift
// Compress M and decompress it into M' with your choice of codec.
Since algorithm 1 is meant for lossless coding, we assume that this causes no compression artifacts
// Extract least significant bits of source
mask = ((1 << ebits) - 1)
E = S & mask
return M, E
}
decode1(M', upshift, E', ebits) {
// Combine most significant and least significant bits
S' = (M' << upshift) | (E')
return S'
}
```

A second algorithm may use a lossy codec for coding the main image (in boxes 220 and 310):

```
encode2(S, upshift, ebits) {
// Round up the upshift bit in the source and shift down. After this, M will
have upshift less bits. I.e., if S is 16 bits and upshift is 6, M will now
have 10 bits.
M = (S + (1 << upshift)) >> (upshift + 1)
// Compress and decompress M to get M'. Here we assume that lossy
coding may be used and that M != M'
M' = decompress(compress(M))
// Calculate how decoder will reconstruct source
R = (M' << (upshift + 1))
// Calculate the residual of S and R. We add (1 << upshift) to counteract
the addition done when creating M.
D = S + (1 << upshift) - R
// NOTE:
// We do the same calculations regardless of if M == M' or M != M'. But
it helps explain what happens if we distinguish between the two cases.
// If M == M', D will be a positive number and will require upshift +
1 bits to code all possible values
// If M != M', D may be both positive and negative value of a size that
depends on how much M and M' differ
// Convert D into something that can be coded in a limited number of bits
=> E
// We can code E with any number of bits. If source has 16 bits and
upshift is 6, we would need 1 bit in E to code sign.
// To not have any losses when E is losslessly coded and M == M', we
therefore need 6 + 2 bits in E. Less can be used, but that will then cause
losses.
// More bits can be used to counteract compression losses when going
from M -> M'.
// E can be coded as a positive number or as a two's complement integer
with 'ebits' number of bits. We go with positive number since that may
compress better.
// Add midpoint value to E and then clamp between 0 and the max value
representable by 'ebits' number of bits.
maxVal = (1 << ebits) - 1
midPoint = 1 << (ebits - 1)
E = min(max(D + midPoint, 0), maxVal)
return M, E
}
decode2(M', upshift, E', ebits) {
// Convert E from the positive number representation back to a residual
midPoint = 1 << (ebits - 1)
D = E - midPoint
R = (M' << (upshift + 1))
S' = D + R - (1 << upshift)
return S'
}
```

A third algorithm may also use a lossy codec for coding the main image (in boxes 220 and 310):

```
encode3(S, upshift, ebits) {
// Discard least significant bits of S to create M
M = S >> upshift
// Compress and decompress M to get M'. Here we assume that lossy
coding may be used and that M != M'
M' = decompress(compress(M))
// Calculate how decoder will reconstruct source
R = M' << upshift
// Calculate the residual of S and R.
D = S - R
// NOTE:
// We do the same calculations regardless of if M == M' or M != M'. But
it
helps explain what happens if we distinguish between the two cases.
// If M == M', we get 0 <= D < (1 << upshift)
// If M != M', D may be both positive and negative value of a size that
depends on how much M and M' differ
// Convert D into something that can be coded in a limited number of bits
=> E
// To not have any losses when E is losslessly coded and M == M', we
need 'ebits' + 1 bits in E. Less can be used, but that will then cause
losses.
// More bits can be used to counteract compression losses when going
from M -> M'.
// Add midpoint value to E and then clamp between 0 and the max value
representable by 'ebits' number of bits.
maxVal = (1 << ebits) - 1
midPoint = 1 << (ebits - 1)
E = min(max(D + midPoint, 0), maxVal)
return M, E
}
decode3(M', upshift, E', ebits) {
// Convert E from the positive number representation back to a residual
midPoint = 1 << (ebits - 1)
D = E - midPoint
R = (M' << (upshift + 1))
S' = D + R
return S'
}
```

In an aspect, encoding method 200 and decoder method 300 may additionally include color space conversion operations (e.g., conversion between RGB and YUV), including color format sampling conversion operations (e.g., conversion between 4:4:4 and 4:2:0 color sampling). For example, the creation of main image M (box 210) and/or extension image E (box 260) may include a color space and/or color sampling conversion, and the main and extension images may not be encoded in the same color space or color sampling. Coding parameters indicating the color space and/or color sampling of the main and/or extension images may be inferred or represented in a coded media file such that the decoding method 300 may apply corresponding color space and/or color sampling conversions when combining the reconstructed main and extension images (box 330). In an aspect, such conversion operations may use the techniques such as the ones specified in BT.2100, BT.709, BT.1886, BT.2390.

FIG. 4 is a functional block diagram of an encoding system 400 according to an aspect of the present disclosure. In an aspect encoding system 400 may be used to implement the method of encoding method 200 of FIG. 2. Encoding system 400 includes a most-significant-bits (MSB) extractor box 402, a main image encoder 404, an image decoder 406, a residual calculator 408, an extension image generator 410, an extension image encoder 412, a control unity 414, and a syntax unit 418.

In operation control 414 may control operation of the various encoding elements of encoding system 400 based on the extension coding parameters "UPSHIFT," "EBITS," and "ALGO." Use of these extension coding parameters is explained more fully above regarding encoding method 200 (FIG. 2). The coding parameters may also be provided to syntax unit 419 for inclusion as metadata in the coded media file. See FIGS. 6-7 for additional details regarding how metadata for extension coding parameter may be included in a coded media file.

In operation, MSB extractor 402 may extract the most significant bits based on UPSHIFT and a source image and a selected extension algorithm ALGO to produce a main image M. Main image encoder 404 may code the main image, and then image decoder 406 may decode the encoded main image to produce reconstructed main image M' Residual calculator 408 may determine the errors in the reconstructed image M by comparing it to the source image S to produce a difference image D, again based on the UPSHIFT and ALGO parameters. Extension image generator 410 may derive an extension image E from the difference image D based on EBITS and ALGO parameters. Extension image encoder 412 may then encode extension image E. Additional details and options for operation of MSB extractor 402, residual calculator 408 and extension image generator 410 are provided above regarding encoding method 200 (FIG. 2).

Syntax unit 418 may include optional container protocol syntax units including main container protocol 430 for encapsulating an encoded main image into a coded media file, and a separate extension container protocol 432 for encapsulating an encoded extension image. In an aspect the main container protocol may be an older legacy protocol while the extension container protocol 432 may be newer. An older parser that supports only the older legacy protocol may be able to extract and decode the encoded main image while ignoring the extension image encapsulated in a newer extension container protocol that it does not understand. In this way some backward compatibility is enabled in legacy parsers that do not understand the newer extension images encapsulated in the extension container protocol.

In an aspect, encoders 404 and 412 may operate with the same underlying image coding protocol, and the underlying image coding protocol(s) may have a maximum bit depth constraint that limits the number of bits used to represent a pixel value. In practice, the bit depth of the source image S may be greater than the maximum bit depth supported by the main image encoder 404, and hence such a source image cannot be fully represented by encoding the source image directly with the main image encoder. The MSB extractor may eliminate some of the least significant bits when creating the main image M, such that main image encoder may be able to fully represent the main image M.

Figure 5:
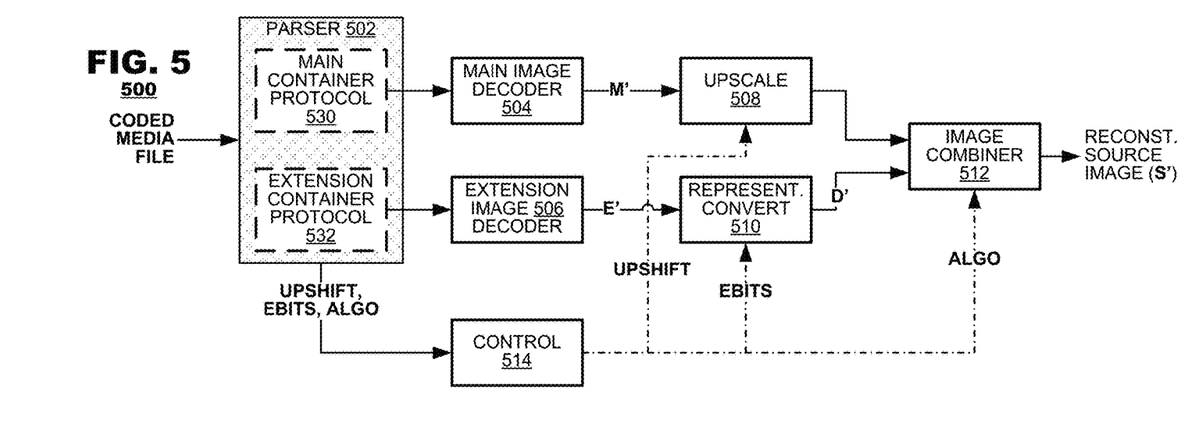
FIG. 5 is a functional block diagram of a decoding system according to an aspect of the present disclosure.

FIG. 5 is a functional block diagram of a decoding system 500 according to an aspect of the present disclosure. In an aspect decoding system 500 may be used to implement the decoding method 300 of FIG. 3. Decoding system 500 includes parser 502, main image decoder 504, extension image decoder 506, upscale 508, a representation converter 510, an image combiner 512, and control 514.

In operation, parser 502 may extract extension control parameters UPSHIFT, EBITS, and ALGO, an encoded main image according to an optional main container protocol 530, and an encoded extension image according to an optional extension container protocol 532. Main image decoder 504 may decode the encoded main image to produce a reconstructed main image M', and upscale 508 may upscale M' based on the UPSHIFT parameter. Extension image decoder 506 may decode the encoded extension image to produce a reconstructed extension image E', and representation converter 510 may derive a reconstructed difference image D' from E' and the EBITS parameter. The image combiner 512 may then combine D' with the upscaled M' to produce a reconstructed source image. In an aspect, the reconstructed source image may have the same bit depth as an original source image S input into image encoder 400.

Additional details and options for operation of upscale 508, representation converter 510, and image combiner 512 may be found above regarding decoding method 300 (FIG. 3).

Figure 6:
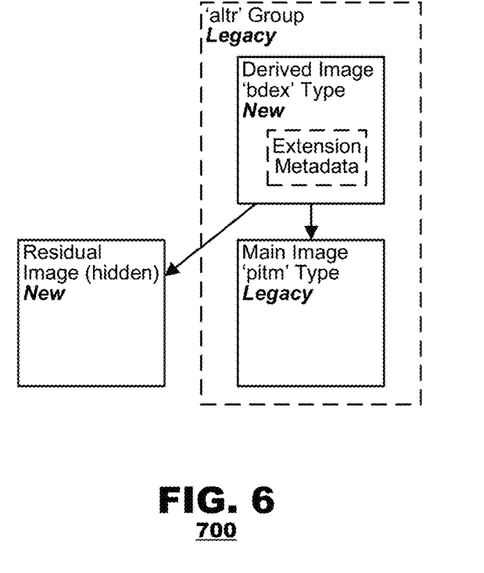
FIG. 6 depicts a first container format structure according to an aspect of the present disclosure.

FIG. 6 depicts a first container format structure 700 according to an aspect of the present disclosure. In this structure, a new HEIF derived image type may be created that we will refer to as 'bdex.' A 'bdex' derived image may refer to other image items via item references, where the first reference may be to the main image ID, the second reference to the first extension image, the third reference to the second extension image and so on. The item body of the 'bdex' derived image may then also contain the following information, which may allow a parser to reconstruct the source image:

```
'bdex' derived image = {
    Number of extension images
    Extension image 0 = {
        UPSHIFT
        EBITS
        ALGO
    }
    ...
    Extension image N = {
        UPSHIFT
        EBITS
        ALGO
    }
}
```

In order to be backwards compatible with older (legacy) parsers, the 'bdex' derived image and the main image may be placed in an 'altr' entity group, which indicates that they are alternative images of each other. A parser that does not understand the 'bdex' image may ignore the 'bdex' image and then choose to decode the main image, while an updated (non-legacy) parser may choose to decode the 'bdex' image.

Figure 7:
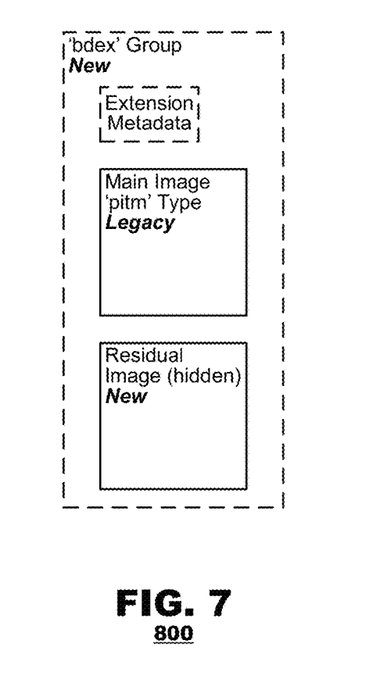
FIG. 7 depicts a second container format structure according to an aspect of the present disclosure.

FIG. 7 depicts a second container format structure 800 according to an aspect of the present disclosure. In this structure, a new entity group may be created that we will refer to as 'bdex.' An entity group may refer to other images via the group entity list. In the 'bdex' group, the first entity may be the main image, the second entity the first extension image, and a third entity (not depicted) may be the second extension image and so on. The group body may also contain extra data after the entity list. This data may contain the information needed to reconstruct the full source image. The 'bdex' group body may look as follows:

```
'bdex' group {
    Entity list
    Number of extension images
    Extension image 0 = {
        UPSHIFT
        EBITS
        ALGO
    }
    ...
    Extension image N = {
        UPSHIFT
        EBITS
        ALGO
    }
}
```

A parser that does not understand the 'bdex' group will ignore the hidden extension images and only decode the main image. An updated parser may choose to use the 'bdex' group to reconstruct the full bit depth of the source image.

The foregoing discussion has described the various embodiments of the present disclosure in the context of coding systems, decoding systems and functional units that may embody them. In practice, these systems may be applied in a variety of devices, such as mobile devices provided with integrated video cameras (e.g., camera-enabled phones, entertainment systems and computers) and/or wired communication systems such as videoconferencing equipment and camera-enabled desktop computers. In some applications, the functional blocks described herein may be provided as elements of an integrated software system, in which the blocks may be provided as elements of a computer program, which are stored as program instructions in memory and executed by a general processing system. In other applications, the functional blocks may be provided as discrete circuit components of a processing system, such as functional units within a digital signal processor or application-specific integrated circuit. Still other applications of the present disclosure may be embodied as a hybrid system of dedicated hardware and software components. Moreover, the functional blocks described herein need not be provided as separate elements. For example, although FIGS. 1-7 illustrate components of video coders and decoders as separate units, in one or more embodiments, some or all of them may be integrated and they need not be separate units. Such implementation details are immaterial to the operation of the present disclosure unless otherwise noted above.

Further, the figures illustrated herein have provided only so much detail as necessary to present the subject matter of the present disclosure. In practice, video coders and decoders typically will include functional units in addition to those described herein, including buffers to store data throughout the coding pipelines illustrated and communication transceivers to manage communication with the communication network and the counterpart coder/decoder device. Such elements have been omitted from the foregoing discussion for clarity.

Several embodiments of the disclosure are specifically illustrated and/or described herein. However, it will be appreciated that modifications and variations of the disclosure are covered by the above teachings and within the purview of the appended claims without departing from the spirit and intended scope of the invention.

We claim:

1. An image encoding method, comprising:
    deriving a main image from most significant bits of pixel values of a source image, pixel values of the main image having a main bit depth determined by a selected upshift number;
    encoding the main image according to a coding protocol;
    decoding the encoded main image as a reconstructed main image;
    deriving an extension image from the reconstructed main image, the source image and the selected upshift number, wherein pixel values of the extension image have an extension bit depth;
    encoding the extension image according to the coding protocol;
    storing, according to a syntax of a coded media file, the encoded main image, the encoded extension image, and coding parameters indicating the extension bit depth and the selected upshift number.

2. The image encoding method of claim 1, wherein the upshift number is selected based on a bit depth of pixel values in the source image and a bit depth constraint of the coding protocol.

3. The image encoding method of claim 1, wherein the extension bit depth is selected as the selected upshift number plus zero or more.

4. The image encoding method of claim 1, wherein the coding protocol supports the main bit depth and does not support a bit depth of pixel values in the source image.

5. The image encoding method of claim 1, wherein
    the deriving of the extension image is based on a selected extension algorithm; and
    the stored coding parameters further indicate the selected extension algorithm.

6. The image encoding method of claim 1, wherein, when the extension bit depth is greater than a bit depth constraint of the coding protocol, the extension image is a temporary image that is recursively encoded by:
    deriving a first extension image from most significant bits of pixel values of the temporary image, pixel values of the first extension image having a first extension bit depth determined by a selected second upshift number;
    encoding the first extension image according to the coding protocol;
    decoding the encoded first extension image as a reconstructed first extension image;
    deriving a second extension image from the reconstructed first extension image, the temporary image, and the selected second upshift number, wherein pixel values of the second extension image have a second extension bit depth;
    encoding the second extension image according to the coding protocol;
    storing, according to the syntax of the coded media file, the encoded first extension image, the encoded second extension image, and a representation of the second extension bit depth and the selected second upshift number.

7. The image encoding method of claim 1, wherein, when the main bit depth is greater than a bit depth constraint of the coding protocol, the main image is a temporary main image that is recursively encoded by:
    deriving a second main image from the most significant bits of pixel values of the temporary main image and a second selected upshift number;
        encoding the second main image according to the coding protocol;
        decoding the second main image as a reconstructed second main image;
        deriving a second extension image from the reconstructed second main image, the temporary main image, the second selected upshift number, wherein the pixel values of the second extension image have a selected second extension bit depth; and
        encoding the second extension image according to the coding protocol,
    storing, according to the syntax of the coded media file, the encoded second main image, the encoded second extension image, and a representation of the second selected upshift number and the selected extension bit depth.

8. The image encoding method of claim 1, wherein the coding parameters are stored in a derived image syntax element indicating the derived image is based on the encoded main image and the encoded extension images.

9. The image encoding method of claim 1, wherein the coding parameters are stored in a group syntax element for a group including the encoded main image and the encoded extension images.

10. The method of claim 1, wherein the syntax represents the coded media file as:
    a main image element that encapsulates the encoded main image,
    a derived image element that encapsulates the encoded extension image, and
    a metadata element that contains:
        a pointer to the main image element,
        a pointer to the derived image element, and
        the coding parameters indicating the extension bit depth and the selected upshift number.

11. An image decoding method, comprising:
    extracting, from a syntax in a coded media file, an encoded main image, an encoded extension image and coding parameters including a selected upshift number of bits and an extension bit depth;

decoding the encoded main image according to a coding protocol to produce a reconstructed main image having pixels with a main bit depth;

decoding the encoded extension image according to the coding protocol to produce a reconstructed extension image having pixel with the extension bit depth;

combining the reconstructed main image with the reconstructed extension image based on the selected upshift number and the extension bit depth to produce a reconstructed source image.

12. The image decoding method of claim 11, wherein the extension bit depth is zero or more greater than selected upshift number.

13. The image decoding method of claim 11, wherein the method is performed by an image decoder that uses a coding protocol that supports the main bit depth and does not support a bit depth of the reconstructed source image.

14. The image decoding method of claim 11, wherein the combining is based on a selected extension algorithm, and the extracted coding parameters further indicate the selected extension algorithm.

15. The image decoding method of claim 11, wherein the coding parameters are extracted from a derived image syntax element indicating the derived image is based on the encoded main image and the encoded extension images.

16. The image decoding method of claim 11, wherein the coding parameters are extracted from a group syntax element for a group including the encoded main image and the encoded extension images.

17. The method of claim 11, wherein the syntax represents the coded media file as:
a main image element that encapsulates the encoded main image,
a derived image element that encapsulates the encoded extension image, and
a metadata element that contains:
a pointer to the main image element,
a pointer to the derived image element, and
coding parameters indicating the extension bit depth and the selected upshift number.

18. An image decoder, comprising:
a parser configured for parsing, from syntax in a coded media file, an encoded main image, an encoded extension image, and coding parameters including a selected upshift number of bits and an extension bit depth;
an image decoder for decoding an encoded image according to a coding protocol;
an extension combiner for combing a main image with an extension image; and
a memory device storing program instructions that, when executed by a processor, cause the processor to:
control decoding, by the image decoder, the encoded main image to produce a reconstructed main image having pixels with a main bit depth;
control decoding, by the image decoder, the encoded extension image to produce a reconstructed extension image having pixel with the extension bit depth;
control combining, by the extension combiner, the reconstructed main image with the reconstructed extension image based on the selected upshift number and the extension bit depth to produce a reconstructed source image.

19. The image decoder of claim 18, wherein the upshift number is selected based on a bit depth of pixel values in the source image and a bit depth constraint of the coding protocol.

20. The image decoder of claim 18, wherein the extension bit depth is selected as the selected upshift number plus zero or more.

21. The image decoder of claim 18, wherein the coding protocol supports the main bit depth and does not support a bit depth of pixel values in the source image.

22. The image decoder of claim 18, the combining of the reconstructed images is based on a selected extension algorithm; and the stored coding parameters further indicate the selected extension algorithm.

* * * * *